United States Patent
Rieh et al.

(10) Patent No.: US 11,616,546 B2
(45) Date of Patent: Mar. 28, 2023

(54) HIGH FREQUENCY BEAM FORMING DEVICE

(71) Applicant: KOREA UNIVERSITY RESEARCH AND BUSINESS FOUNDATION, Seoul (KR)

(72) Inventors: Jae-Sung Rieh, Seoul (KR); Jung-Hwan Yoo, Seoul (KR)

(73) Assignee: Korea University Research and Business Foundation, Seoul (KR)

(*) Notice: Subject to any disclaimer, the term of this patent is extended or adjusted under 35 U.S.C. 154(b) by 0 days.

(21) Appl. No.: 17/198,416

(22) Filed: Mar. 11, 2021

(65) Prior Publication Data
US 2022/0069875 A1 Mar. 3, 2022

(30) Foreign Application Priority Data
Sep. 2, 2020 (KR) .................... 10-2020-0111581

(51) Int. Cl.
*H04B 7/06* (2006.01)
*H01Q 3/38* (2006.01)
*H04W 16/28* (2009.01)

(52) U.S. Cl.
CPC .......... *H04B 7/0617* (2013.01); *H01Q 3/38* (2013.01); *H04W 16/28* (2013.01)

(58) Field of Classification Search
CPC ........ H04B 7/0617; H01Q 3/38; H04W 16/28
See application file for complete search history.

(56) References Cited

U.S. PATENT DOCUMENTS 10,944,171 B2* 3/2021 O'Leary ................ H01Q 3/28
2003/0119469 A1* 6/2003 Karr ...................... H01Q 1/273
   455/307
2021/0159594 A1* 5/2021 Tiebout ................ H01Q 3/267

FOREIGN PATENT DOCUMENTS

JP    2019-193181 A    10/2019
KR    10-2020-0008866 A    2/2000
WO    WO 2017/010111 A1    1/2017

OTHER PUBLICATIONS

Pogorzelski, ("A two-dimensional coupled oscillator array," in IEEE Microwave and Guided Wave Letters, vol. 10, No. 11, pp. 478-480, Nov. 2000, doi: 10.1109/75.888838). (Year: 2000).*
A. Zamora, M. K. Watanabe, J. M. Akagi, T. F. Chun and W. A. Shiroma, "An inter-element phase-detecting retrodirective array for nonuniform wavefronts," 2009 IEEE MTT-S International Microwave Symposium Digest, 2009, pp. 817-820, doi: 10.1109/MWSYM.2009.5165822. (Year: 2009).*

* cited by examiner

*Primary Examiner* — Jaison Joseph
(74) *Attorney, Agent, or Firm* — NSIP Law

(57) ABSTRACT

Disclosed is a high frequency beam forming device. The high frequency beam forming device includes a 2D radiation array structure unit in which oscillators coupled to antennas are arranged in 2D; and a plurality of phase difference detectors coupled between the oscillators formed in the 2D radiation array structure unit to detect a phase difference between the coupled oscillators.

5 Claims, 6 Drawing Sheets

HIGH FREQUENCY BEAM FORMING DEVICE

CROSS-REFERENCE TO RELATED APPLICATION

This application claims under 35 U.S.C. § 119(a) the benefit of Korean Patent Application No. 10-2020-0111581 filed on Sep. 2, 2020, the entire contents of which are incorporated herein by reference.

BACKGROUND

(a) Technical Field

The present invention relates to a high frequency beam forming device based on a phase difference detector.

(b) Background Art

High frequency, particularly a millimeter wave/terahertz frequency band, may be applied to various fields, such as imaging, spectroscopy, biochemical detection, astronomy, and broadband communication. Interest in such a frequency band is increasing, and has been motivated to implement a system based on a semiconductor device having advantages, such as a small size, low cost, and low power driving.

The most interesting part of a millimeter wave/terahertz frequency band wireless transmission/reception system may be referred to as a beam forming technology capable of dramatically increasing a transmission/reception gain. For example, to describe the beam forming technology, beam forming in a wireless communication system is a method of a smart antenna, and a technology in which a beam of an antenna is limited and illuminated to only a corresponding terminal. A broadband wireless communication system to increase data transmission rate, such as a 5G system, increase a transmission frequency to several GHz or tens of GHz bands to secure a bandwidth. As the transmission frequency increases, the straightness of an electromagnetic wave becomes stronger and the transmission loss increases. Therefore, the beam forming technology is essentially installed in order to increase the transmission gain.

A basic structure of the beam forming system is to adjust phases of signals transmitted and received by each antenna through a phase shifter before a transmitting and receiving antenna. Here, as the transmission frequency increases, the power loss of the phase shifter increases and the accuracy decreases, so that it is difficult to implement a phase array for beam forming.

The above information disclosed in this Background section is only for enhancement of understanding of the background of the invention and therefore it may contain information that does not form the prior art that is already known in this country to a person of ordinary skill in the art.

SUMMARY OF THE DISCLOSURE

An object of the present invention is to provide a high frequency beam forming device capable of enabling beam steering based on a phase array structure using only an oscillator without a phase shifter.

In addition, another object of the present invention is to provide a high frequency beam forming device capable of implementing a beam at a desired angle without a complicated measurement setup by checking a phase difference between oscillators in real time.

According to an aspect of the present invention, there is provided a high frequency beam forming device capable of enabling beam steering based on a phase array structure using only an oscillator without a phase shifter.

According to an embodiment of the present invention, there is provided a high frequency beam forming device including: a 2D radiation array structure unit in which oscillators coupled to antennas are arranged in 2D; and a plurality of phase difference detectors coupled between the oscillators formed in the 2D radiation array structure unit to detect a phase difference between the coupled oscillators.

The oscillators formed in the 2D radiation array structure unit may operate at the same oscillation frequency, and output signals of different phases according to a control voltage to be applied differently according to a position of the oscillator.

The phase difference detector may include a power combiner which is coupled between the oscillators forming a coupling network in the 2D radiation array structure unit and adds signals output from the coupled oscillators; and a power detector connected to an output terminal of the power combiner and detecting a signal combined by the power combiner.

The high frequency beam forming device may further include a voltage controller which analyzes the phase difference detected by the phase difference detector to apply a control voltage for beam steering at a target angle to the oscillators, respectively.

According to another embodiment of the present invention, there is provided a radiation array system including: a first antenna and a second antenna; a first oscillator connected to the first antenna and a second oscillator connected to the second antenna; and a phase difference detector which is coupled between the first oscillator and the second oscillator to detect a phase difference by combining signals output from the first oscillator and the second oscillator.

By providing a high frequency beam forming device according to an embodiment of the present invention, there is an advantage of enabling beam steering based on a phase array structure using only an oscillator without a phase shifter.

In addition, there is an advantage of implementing a beam at a desired angle without a complicated measurement setup by checking a phase difference between oscillators in real time.

It should be understood that the effects of the present invention are not limited to the effects described above, but include all effects that can be deduced from the detailed description of the present invention or configurations of the invention described in appended claims.

DETAILED DESCRIPTION

A singular form used in the present specification may include a plural form if there is no clearly opposite meaning in the context. In this specification, terms such as "comprising" or "including" should not be interpreted as necessarily including all various components or various steps disclosed in this specification, and it should be interpreted that some component or some steps among them may not be included or additional components or steps may be further included. In addition, terms including "unit", "module", and the like disclosed herein mean a unit that processes at least one function or operation, and this may be implemented by hardware or software or a combination of hardware and software.

Hereinafter, embodiments of the present invention will be described in detail with reference to the accompanying drawings.

Figure 1:
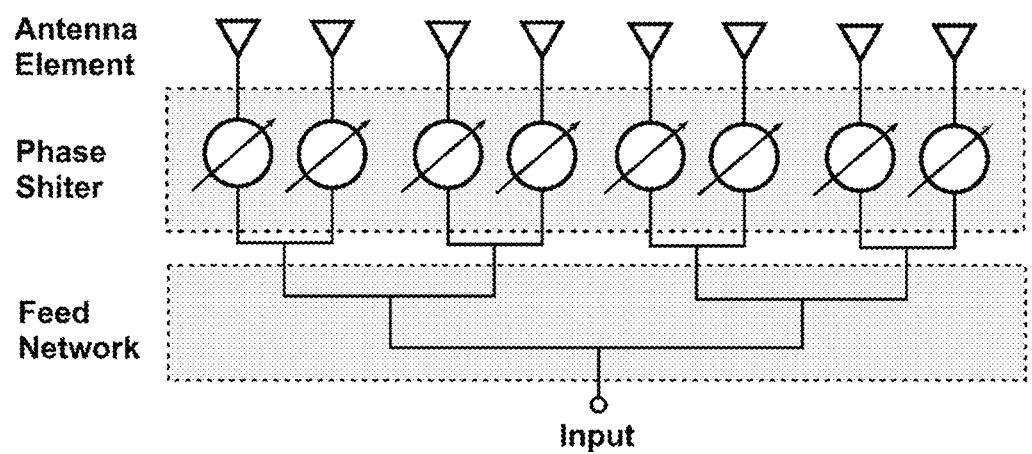
FIG. 1 is a diagram schematically illustrating a beam forming device using a phase shifter in the related art.

FIG. 1 is a diagram schematically illustrating a beam forming device using a phase shifter in the related art.

When a transmission wave signal is applied, a signal is transmitted to a phase shifter via a distribution network. When a variable voltage reflecting a beam forming angle is input to the phase shifter and then the transmission wave signal is converted, the transmission wave signals having different phases are sequentially radiated from each antenna.

For this reason, in the conventional structure as illustrated in FIG. 1, the angle and width of the beam are determined according to a phase change of the signal radiated from each antenna. There is a problem in that the higher the transmission wave frequency, the greater the power loss of the distribution network and the phase shifter.

As the frequency increases, the antenna size decreases, which is advantageous in increasing the number of antennas, but there is a problem in that the difficulty of integrating phase shifts in each antenna also increases.

Figure 2:
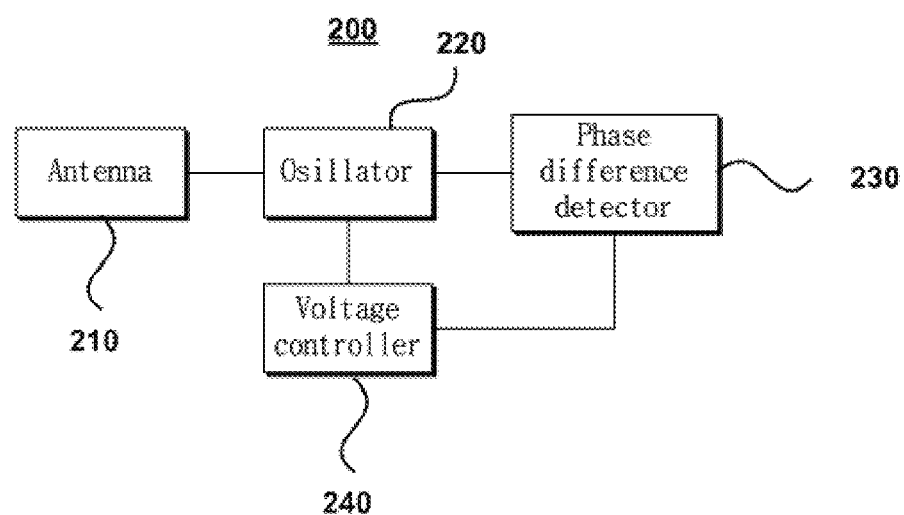
FIG. 2 is a block diagram illustrating a high frequency beam forming device according to an embodiment of the present invention.
Figure 3:
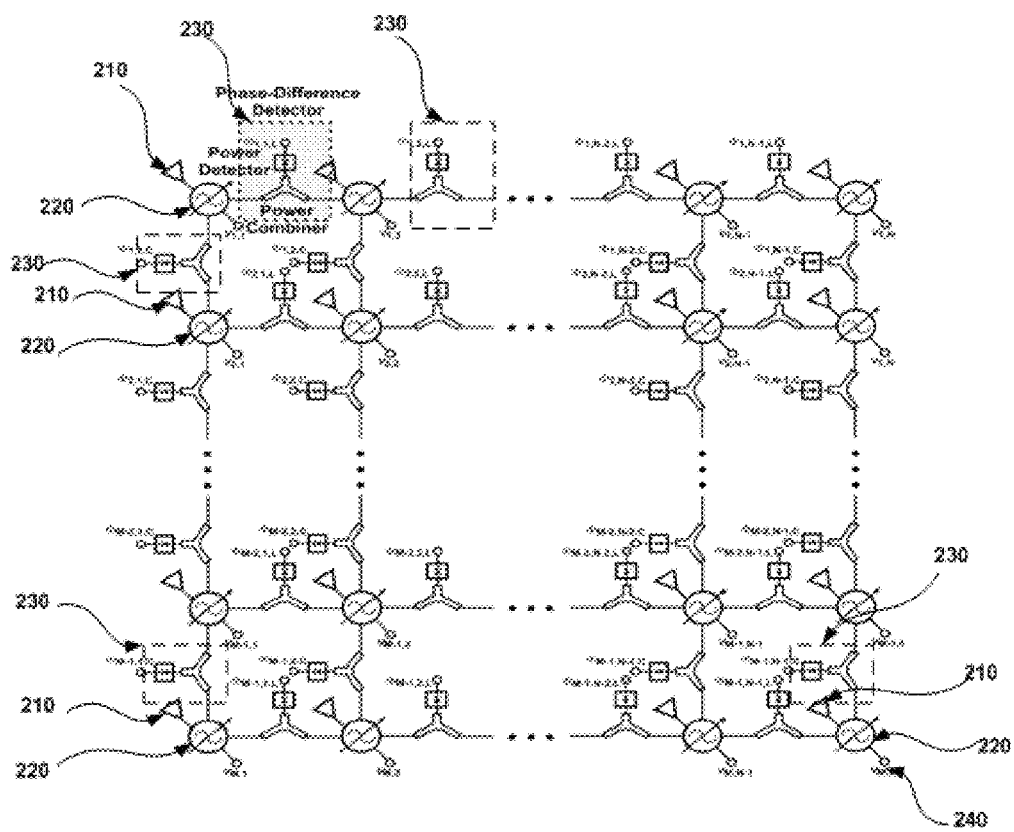
FIG. 3 is a diagram illustrating a detailed structure of the high frequency beam forming device according to an embodiment of the present invention.
Figure 4:
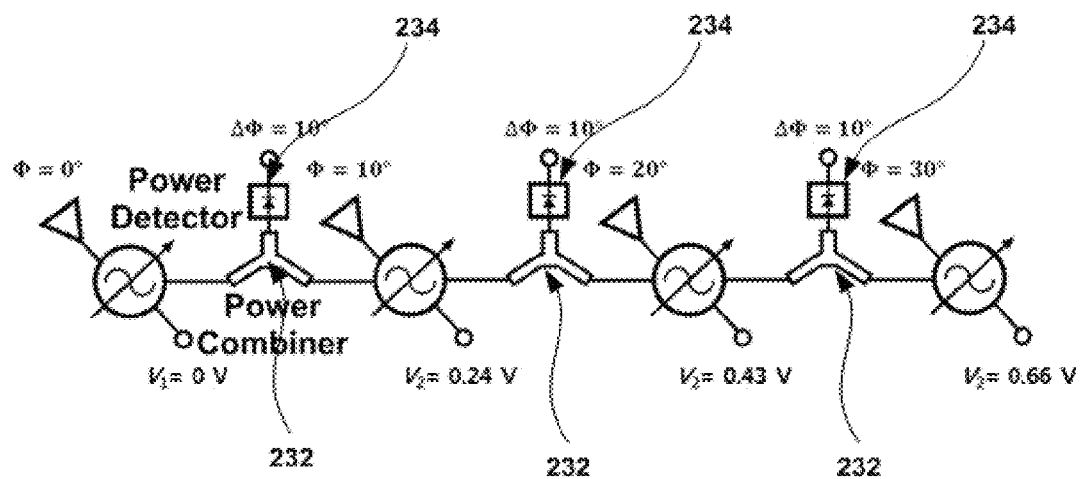
FIG. 4 is a diagram illustrating phase detection of each oscillator according to an embodiment of the present invention.
Figure 5:
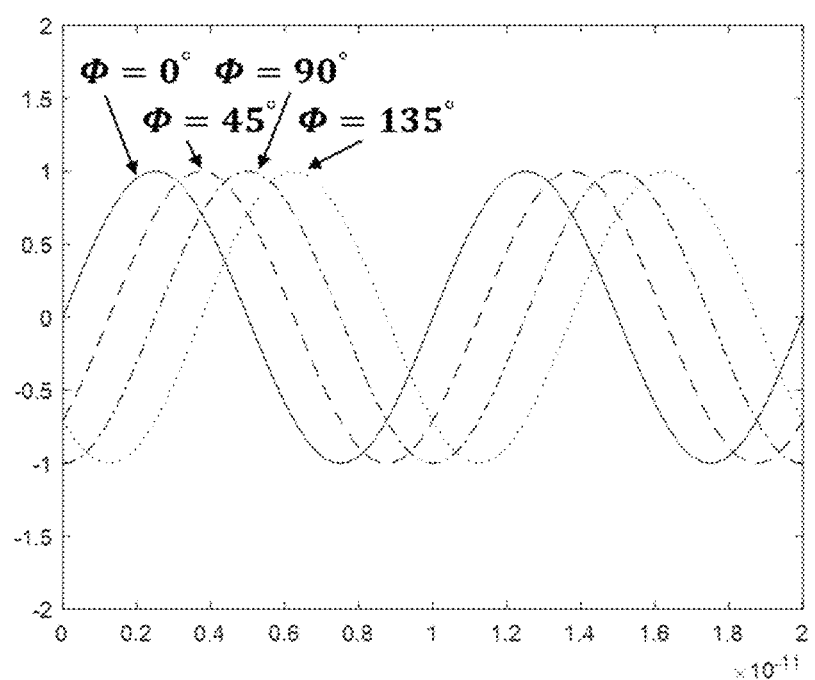
FIG. 5 is a diagram for describing a phase difference between oscillators according to an embodiment of the present invention.
Figure 6:
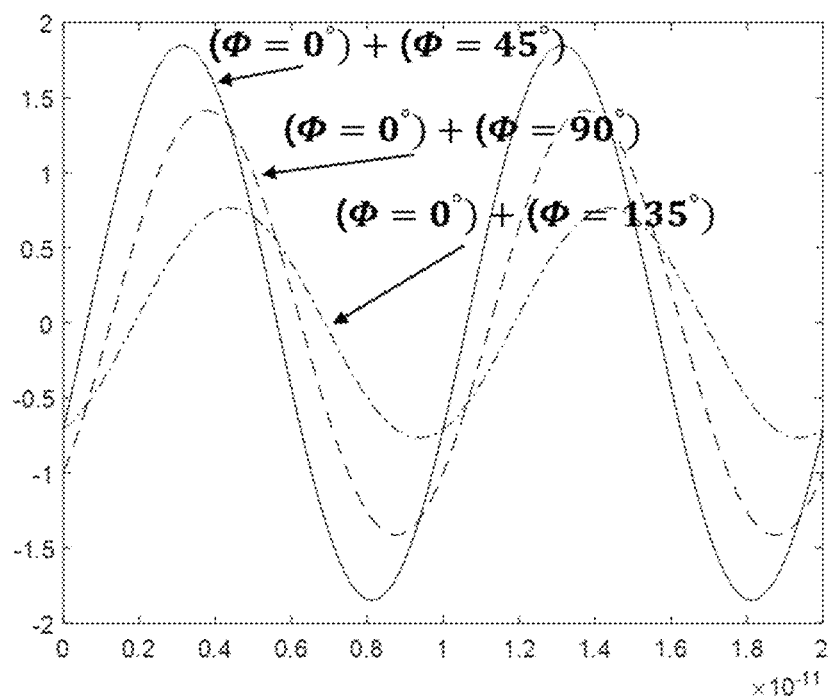
FIG. 6 is a diagram for describing a basic principle of a phase difference detector according to an embodiment of the present invention.

FIG. 2 is a block diagram illustrating a high frequency beam forming device according to an embodiment of the present invention, FIG. 3 is a diagram illustrating a detailed structure of the high frequency beam forming device according to an embodiment of the present invention, FIG. 4 is a diagram illustrating phase detection of each oscillator according to an embodiment of the present invention, FIG. 5 is a diagram for describing a phase difference between oscillators according to an embodiment of the present invention, and FIG. 6 is a diagram for describing a basic principle of a phase difference detector according to an embodiment of the present invention.

Referring to FIG. 2, a high frequency beam forming device 200 according to an embodiment of the present invention includes a plurality of antennas 210, a plurality of oscillators 220, a phase difference detector 230, and a voltage controller 240.

The antennas 210 and the oscillators 220 are formed in a 2D radiation array structure. That is, each of the antennas 210 may be coupled to each of the oscillators 220 to be disposed in a 2D array structure. For convenience of understanding and explanation, the antennas and the oscillators will be referred to as a 2D radiation array structure unit.

According to an embodiment of the present invention, the oscillators formed in the 2D radiation array structure unit may form a coupling network.

Each of the oscillators included in the 2D radiation array structure unit has the same oscillation frequency and may output an output signal having a different phase according to a control voltage.

In the 2D radiation array structure unit, the oscillators may be coupled to each other, or may be coupled to each other through other configurations to form a coupling network.

FIG. 3 illustrates a detailed structure therefor.

The oscillators included in the 2D radiation array structure unit in which the antennas and the oscillators are integrated and arranged in the 2D radiation array structure may be coupled to each other to form a coupling network. In this case, the phase difference detector 230 is coupled between the coupled oscillators to detect a phase difference by adding signals output from the coupled oscillators.

As illustrated in FIG. 3, a first phase difference detector may be coupled between the first oscillator and the second oscillator, and a second phase difference detector may be coupled between the second oscillator and the third oscillator.

The phase difference detector may be coupled even between the oscillators arranged in a vertical direction to the first oscillator.

As described above, according to an embodiment of the present invention, each phase difference detector may be coupled between the oscillators formed in the 2D radiation array structure unit.

The phase difference detector 230 is a means for detecting a phase difference between the oscillators coupling-connected to each other.

The detailed structure of the phase difference detector 230 is as illustrated in FIG. 4. That is, the phase difference detector 230 includes a power combiner 232 and a power detector 234.

The power combiner 232 is coupled between the oscillators, and is a means for coupling a signal output from the coupled oscillators.

For example, when the power combiner 232 is coupled between the first oscillator and the second oscillator, signals output from the first oscillator and the second oscillator may be added and combined, respectively.

The oscillators formed in the 2D radiation array structure unit are integrated into a structure capable of being coupled to the coupling network and simultaneously adding power through the power combiner 232. Accordingly, the power combiner 232 may add and output signals output from the oscillators coupled in the coupling network.

The power detector 234 is coupled to an output terminal of the power combiner 232. Accordingly, the power (voltage) obtained by combining signals output between the coupled oscillators may be detected by the power detector 234.

That is, according to an embodiment of the present invention, since the phase difference between the respective oscillators according to the control voltage applied to the respective oscillators may be detected, the phase change according to a change in control voltage may be monitored in real time.

For example, this will be described in more detail with reference to FIG. 4.

It is assumed that a first control voltage applied to the first oscillator is $V_1 = 0$ V. In this case, the phase of the first oscillator may be 0°. It is assumed that a second control voltage applied to the second oscillator coupled with the first oscillator is $V_2 = 0.24$ V. In this case, as the first phase difference detector coupled between the first oscillator and the second oscillator detects a phase difference between two oscillators, the phase of the second oscillator may be checked.

For example, when the first phase difference detector detects the phase difference between the first oscillator and the second oscillator by 10°, since the phase of the first oscillator is fixed at 0°, it can be seen that the phase of the second oscillator is 10°.

In this way, according to an embodiment of the present invention, there is an advantage of being able to determine the phase of each oscillator by detecting the phase difference between the oscillators formed in the 2D radiation array structure unit.

In order to form a beam having an accurate shape in a radiation array structure without using a phase shifter, it is necessary to know the phase of a signal transmitted from each oscillator. In the case of an oscillator array having an oscillation frequency of several tens of GHz or more, there is a problem that it is difficult to determine the phase difference between the respective oscillators with a conventional technology.

For example, this will be described with reference to FIG. 5. FIG. 5 is a graph showing a phase difference between four oscillators having an oscillation signal of 100 GHz and a phase difference of 45°. The period of the oscillation signal at 100 GHz is about 10 ps and the difference of 45° is expressed in time as 10×45/180=2.5 ps. In order to detect the phase difference with a combiner-based circuit such as a phase detector, there is a problem that it is difficult to be implemented in practice, such as detecting a pulse of 2.5 ps.

However, like an embodiment of the present invention, when a signal output between the oscillators is added while the power combiner is coupled between the oscillators in the coupling network of the respective oscillators, the level of the combined power (voltage) varies according to the phase difference.

As illustrated in FIG. 6, it may be theoretically confirmed that a voltage width gradually decreases as the phase difference of the signal increases.

That is, if the power detector 234 may detect the power level according to the phase difference between the oscillators with sufficient sensitivity, the phase difference between the oscillators may be mapped at 1:1 according to a control voltage of the oscillator.

As described above, since the phase difference detector 230 is able to monitor through self-correction how much the phase may be changed according to the control voltage of each oscillator in the 2D radiation array structure unit, there is an advantage capable of accurately implementing beam steering in real time without complicated measurement and correction.

The voltage controller 240 may apply different control voltages to the oscillators for beam steering at a target angle by analyzing a phase difference between the respective oscillators included in the 2D radiation array structure unit based on a lookup table.

In summary, according to an embodiment of the present invention, the phase difference detector is coupled between the oscillators forming the 2D radiation array structure to detect the phase difference between the respective oscillators, thereby accurately determining phases of radio waves radiated from each oscillator.

Accordingly, the high frequency beam forming device 200 according to an embodiment of the present invention has an advantage of being able to monitor a phase change according to a control voltage change of each oscillator in real time, thereby forming a beam at a desired target angle with an accurate control voltage value.

The device and the method according to the embodiment of the present invention may be implemented in a form of program instructions which may be performed through various computer means to be recorded in a computer readable medium. The computer readable medium may include program instructions, data files, data structures, and the like alone or in combination. The program instructions recorded in the medium may be specially designed and configured for the present invention, or may be publicly known to and used by those skilled in a computer software field. Examples of the computer readable medium include magnetic media, such as a hard disk, a floppy disk, and a magnetic tape, optical media such as a CD-ROM and a DVD, magneto-optical media such as a floptical disk, and hardware devices such as a ROM, a RAM, and a flash memory, which are specially configured to store and execute the program instructions. Examples of the program instructions include high-level language codes executable by a computer by using an interpreter and the like, as well as machine language codes created by a compiler.

The hardware device described above may be configured to be operated as one or more software modules to perform the operation of the present invention and vice versa.

Hereinabove, the present invention has been described with reference to the embodiments thereof. It is understood to those skilled in the art that the present invention may be implemented as a modified form without departing from an essential characteristic of the present invention. Therefore, the disclosed embodiments should be considered in an illustrative viewpoint rather than a restrictive viewpoint. The scope of the present invention is illustrated by the appended claims rather than by the foregoing description, and all differences within the scope of equivalents thereof should be construed as being included in the present invention.

What is claimed is:

1. A high frequency beam forming device comprising:
a 2D radiation array structure unit, in which a plurality of oscillators coupled to a plurality of antennas are arranged in 2D; and
a plurality of phase difference detectors coupled between the plurality of oscillators arranged in the 2D radiation array structure unit to detect a phase difference between the plurality of oscillators coupled,
wherein each of the plurality of phase difference detectors comprises:
a power combiner, which is coupled between the plurality of oscillators forming a coupling network in the 2D radiation array structure unit and adds signals output from the plurality of oscillators coupled; and
a power detector connected to an output terminal of the power combiner and detecting a signal combined by the power combiner, and
wherein each of the plurality of oscillators is directly coupled to a first power combiner of one of the plurality of phase difference detectors and a second power combiner of another of the plurality of phase difference detectors.

2. The high frequency beam forming device of claim 1, wherein the plurality of oscillators arranged in the 2D radiation array structure unit operate at the same oscillation frequency, and output signals of different phases according to a control voltage to be applied differently according to a position of the plurality of oscillator.

3. The high frequency beam forming device of claim 1, further comprising:

a voltage controller, which analyzes the phase difference detected by each of the plurality of phase difference detectors to apply a control voltage for beam steering at a target angle to each of the plurality of oscillators, respectively.

4. The high frequency beam forming device of claim 3, wherein a lookup table, in which the control voltage and a phase are mapped, is stored, and
wherein the voltage controller differently applies the control voltage for beam steering at a target angle to each of the plurality of oscillators based on the phase difference detected by each of the plurality of phase difference detectors with reference to the lookup table.

5. A radiation array system comprising:
a first antenna, a second antenna, and a third antenna;
a first oscillator connected to the first antenna, a second oscillator connected to the second antenna, and a third oscillator connected to the third antenna;
a first phase difference detector, which is coupled between the first oscillator and the second oscillator, to detect a phase difference by combining signals output from the first oscillator and the second oscillator; and
a second phase difference detector, which is coupled between the second oscillator and the third oscillator, to detect a phase difference by combining signals output from the second oscillator and the third oscillator,
wherein each of the first and second phase difference detectors comprises:
a power combiner, which is coupled between the first and second oscillators forming a coupling network in a 2D radiation array structure unit and adds signals output from the first and second oscillators; and
a power detector connected to an output terminal of the power combiner and detecting a signal combined by the power combiner, and
wherein the second oscillator is directly coupled to a first power combiner of the first phase difference detector and a second power combiner of the second phase difference detector.

* * * * *